(12) United States Patent
Anke et al.

(10) Patent No.: US 7,616,642 B2
(45) Date of Patent: Nov. 10, 2009

(54) PRIORITY ASSIGNMENT AND TRANSMISSION OF SENSOR DATA

(75) Inventors: Juergen Anke, Dresden (DE); Mario Neugebauer, Dresden (DE); Gregor Hackenbroich, Dresden (DE)

(73) Assignee: SAP AG, Walldorf (DE)

( * ) Notice: Subject to any disclaimer, the term of this patent is extended or adjusted under 35 U.S.C. 154(b) by 579 days.

(21) Appl. No.: 11/325,824

(22) Filed: Jan. 4, 2006

(65) Prior Publication Data

US 2007/0153802 A1 Jul. 5, 2007

(51) Int. Cl.
*H04L 12/56* (2006.01)
(52) U.S. Cl. .................. 370/395.42; 370/338; 370/235
(58) Field of Classification Search ................ 370/338, 370/235.1, 352, 412, 395.42, 395.62, 235, 370/94, 328; 340/870.01; 709/226
See application file for complete search history.

(56) References Cited

U.S. PATENT DOCUMENTS

| | | | | |
|---|---|---|---|---|
| 4,748,620 A | * | 5/1988 | Adelmann et al. | 370/394 |
| 6,452,915 B1 | * | 9/2002 | Jorgensen | 370/338 |
| 6,647,419 B1 | * | 11/2003 | Mogul | 709/226 |
| 6,798,743 B1 | * | 9/2004 | Ma et al. | 370/235 |
| 7,339,489 B2 | * | 3/2008 | Arita et al. | 340/693.3 |
| 2005/0122231 A1 | * | 6/2005 | Varaiya et al. | 340/870.01 |
| 2005/0174961 A1 | * | 8/2005 | Hrastar | 370/328 |
| 2006/0221934 A1 | * | 10/2006 | Cooke et al. | 370/352 |

FOREIGN PATENT DOCUMENTS

WO WO 02/28036 * 4/2002

\* cited by examiner

*Primary Examiner*—Dang T Ton
*Assistant Examiner*—Mohamed Kamara
(74) *Attorney, Agent, or Firm*—Kenyon & Kenyon LLP (57) ABSTRACT

Prioritized transmission of data from a mobile device, where the mobile device includes the ability to transmit data using more than one transmission medium, includes generating data packets from sensor data. The data packet is then assigned a priority level based on the sensor data and various factors relating to the transmission mediums. The priority level may be assigned based on the transmission availability, bandwidth and cost of using the medium. The data packets, based on the assigned priority level, are then stored in a corresponding priority buffer associated with a transmission device using one of the transmission mediums. When available, the transmission device may then readily transmit the data packet from the priority buffer. Therefore, the data is transferred in a prioritized order based, in part, on the transmission medium and factors relating to the medium, as well as the sensor data being transmitted.

15 Claims, 4 Drawing Sheets

PRIORITY ASSIGNMENT AND TRANSMISSION OF SENSOR DATA

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The present invention relates generally to transmitting sensor data from a remote device and more specifically to prioritizing sensor data and controlling the transmission of data packets from a mobile device (e.g. a motor vehicle) to a central processing system.

Existing predictive maintenance systems allow for early determinations of anticipated problems with operational devices. In these systems, product embedded information devices (PEIDs), which may be embodied as sensors, record the various operational aspects of a device. These PEIDs can record various factors, such as oil pressure, fluid levels, operating efficiency, time since previous repairs, locations, and other factors.

An existing predictive maintenance technique is a resident calculation technique in which an on-board computing system analyzes sensor data for a remote device. For example, a remote device may be an automobile or piece of heavy construction equipment that may travel to various locations over the course of a day.

Due to size and processing limitations, mobile devices do not have the capacity for sophisticated levels of computation. These systems can provide basic computing ability, which typically consists of comparing a sensor data reading to a chart of ranges. If the sensor data is outside of the range, the processing device may then provide a cursory notification. For example, if the oil level is below a threshold level, an oil light may be illuminated. These on-board systems are restricted to basic computations of a binary determination of whether a component's operation is either inside or outside of a predetermined operating range.

Another predictive maintenance technique includes using a back end processing system to perform various levels of calculations on the sensor data. This technique is typically limited to stationary devices because there is a dedicated communication path between the device and the back end processing system. It can be beneficial to communicate the data packet between the remote device and the back end processing system, but problems exist in the limited amount of data that can be exchanged therebetween. The back end processing system may be able perform a larger variety of processing operations on this data packet than available with the on-board processing system of the remote device. The back end processing system may also be able to additionally cross reference the sensor data with a large collection of information available in a networked environment, thereby providing a greater degree of analysis currently locally available on the remote device.

Limitations associated with the remote device communicating with the back end processing system include the remote device's location and ability to transmit data. The remote device may include the ability to transmit data over different mediums (e.g. WLAN, cellular, terrestrial, etc.) Each medium includes corresponding factors, such as transmission range, cost and available bandwidth. For example, a WLAN connection may have little cost and a high bandwidth, but a very limited transmission range. Conversely, the terrestrial connection may have extremely high costs, limited bandwidth and an almost universal range.

As the mobile device includes the ability to communicate across numerous transmission mediums, it is beneficial to determine which data should be sent over which transmission medium. Existing systems for prioritizing data transmissions address numerous factors, such as prioritizing the data based on service level agreements between a transmitting device and a receiving device. In this approach, a higher level service agreement provides improved priority in data packet transmissions. Another approach is adjusting a scheduling mechanism for different communication mediums, but this approach simply seeks to maximize the amount of data submitted when a particular communication medium is available and does not insure higher priority data is necessarily transmitted. Another approach includes scheduling communications based solely on the priority of the data to be sent across a single transmission medium and prioritizing the collective packets to be sent on this one medium. Therefore, the current techniques provide inflexible data transmission techniques without accounting for the type of data and the transmission medium availability.

DETAILED DESCRIPTION OF THE INVENTION

Sensor data collected on a mobile device may be transmitted using different available transmission mediums. If the mobile device can transmit data using the different transmission mediums, sensor data may be prioritized based on various factors, including the transmission costs, availability and bandwidth associated with the different transmission mediums. As the mobile device ranges in and out of different transmission areas, the communication of the data packet may not be readily assured. Therefore, the data packet is prioritized and made readily available for transmission in associated buffers for when the mobile device is within a corresponding transmission range.

Figure 1:
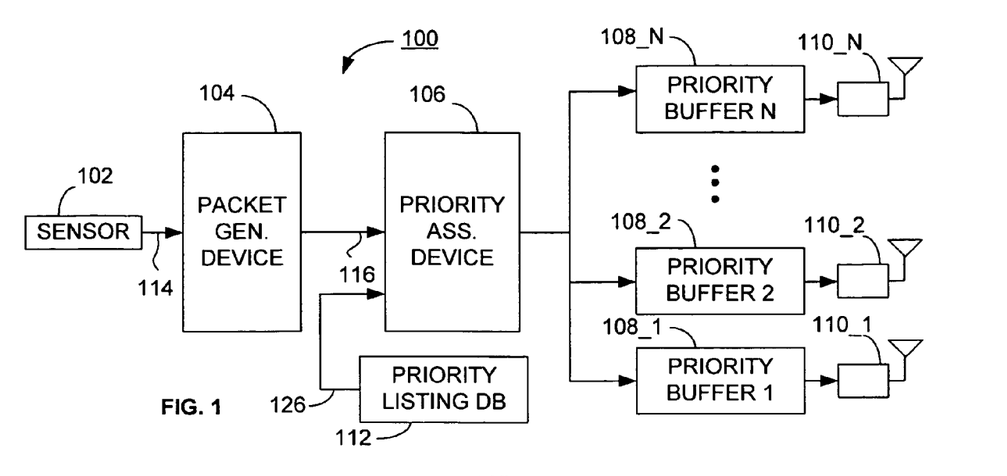
FIG. 1 illustrates a block diagram of one embodiment of an apparatus for prioritized transmission of data.

FIG. 1 illustrates one embodiment of an apparatus 100 for prioritized transmission of data from a mobile device. The apparatus 100 includes a sensor 102, a packet generation device 104, a priority assignment device 106, a plurality of priority buffers 108_1, 108_2 and 108_N (collectively referred to as 108) and a plurality of transmission devices 110_1, 110_2 and 110_N (collectively referred to as 110), where N may be any integer. Additionally, the apparatus 100 includes a priority listing database 112 coupled to the priority assignment device 106.

The apparatus 100 may be disposed within a mobile device; for example if the mobile device is a vehicle, the apparatus may be included within an on-board processing system. The sensor 102 may be any suitable type of sensing device capable of generating sensor data 114 and providing information as to one or more components, elements, operational features or other information being sensed. For example, in one embodiment, the sensor 102 may be one or more PEIDs measuring engine characteristics of a motor vehicle or a passive element such as an RFID tag. The packet generation device 104 and the priority assignment device 106 may be one or more processing elements operative to perform noted functionalities, as described in further detail below.

The priority buffers 108 may be any suitable storage device capable of temporarily storing data for intended subsequent transmission by the transmission devices 110. The devices 110 represent various transmitting elements operative to transmit data signals in different transmission mediums. The devices 110 will typically include functionality for encoding the data to be transmitted in a manner consistent with the communication medium. Additionally, the devices 110 may include functionalities for providing communication sessions, where appropriate, with one or more reception devices, such as for example in a cellular communication providing initiation commands and other associated protocol information for providing proper communication with a recipient device (not shown). Each device 110 is associated with a separate transmission medium; therefore, if the apparatus 100 has the capacity to transmit data using four different transmission mediums, the value N as applied to elements 108_N and 110_N would be equal to 4.

In the embodiment of FIG. 1, the sensor 102 determines the sensor data 114 using recognized data collection techniques. This sensor data 114 is provided to the packet generation device 104 that converts the sensor data 114 into a data packet 116. In one embodiment, the packet generation device 104 may perform pre-processing on the sensor data 114, such as converting the measurement units, adjusting the data by a scaling factor, or other operations as recognized by one skilled in the art.

Figure 2:
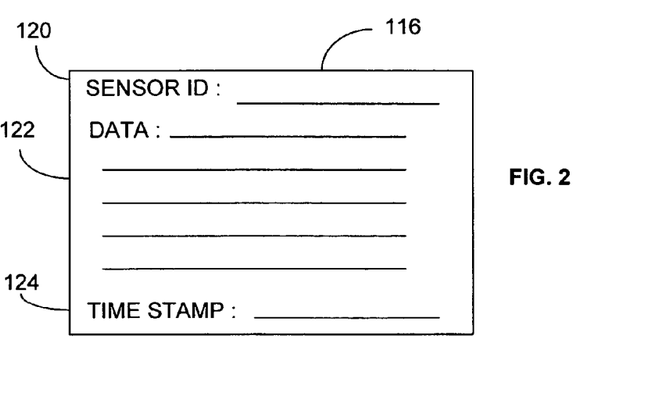
FIG. 2 illustrates a graphical representation of one embodiment of a data packet.

The packet generation device 104 may also generate a time stamp that is included within the data packet. The time stamp may indicate a time when the data packet was generated, and this time stamp may be used in further processing steps of the apparatus 100, as described in further detail below with respect to FIGS. 5-8. The data packet 116 may be a machine readable data packet, such as encoded in a mark-up language. FIG. 2 illustrates a graphical representation of a data packet 116 as readable by a processing device. It is noted that FIG. 2 illustrates a graphical representation for illustration purposes only and that the data packet 116 may be a combination of encoded data fields that, when read by a processing device provide, the illustration of FIG. 2.

The data packet 116 of FIG. 2 includes 3 exemplary fields. A sensor identification field 120 may identify the sensor 102 from where the sensor data 114 used to generate the data packet 116 was received. A data field 122 indicates the data to be included in the data packet 116. For example, the data field 122 may be measurement data for one or more elements monitored by the sensor 102. In another example, the data field 122 may include a message or notification, such as a notification that a particular component has exceeded operation threshold levels. The data field 122 may also include information as to when the data packet 102 was acquired. A time stamp 124 is also included to indicate when the data packet was generated.

Referring back to FIG. 1, the priority assignment device 106 receives the data packet 116. The priority assignment device 106 is operative to assign a priority level to the data packet 116 by providing the data packet to one of the plurality of priority buffers 108. This priority assignment is based on priority data 126 that may be stored in the priority listing database 112. The priority data 126 may include a list of the different types of data packets and the corresponding priority for each of the data packets. In this embodiment, the priority assignment device 106 may quickly reference a list of data packets and based on that list forward the data packet 116 to an assigned priority buffer, where the assigned priority buffer is one of the priority buffers 108.

The data packet 116 is assigned a particular priority level based on numerous factors. One factor is the information or content of the data packet 116. For example, if the content of the data packet 116 is a warning signal that a particular element within the mobile device is about to fail, this may be given a much higher priority than a data packet 116 indicating that another element's operation is within normal guidelines. Another factor is the cost associated with the utilization of the transmission medium. Some mediums have a much greater cost per transmission or communication than other mediums. Other factors may be the availability of the transmission medium, such as the transmission range and the available bandwidth within the medium. Some mediums provide a high degree of bandwidth, but include a limited amount of availability. For example, a WLAN connection has a high bandwidth for transmitting large amounts of data, but the transmission range and its subsequent availability is smaller than a cellular connection having a smaller transmission rate and a higher transmission range.

The priority list 126 used to assign the data packet 116 to a particular priority buffer 108 may be provided to the apparatus 100 from an external source. For example, a user may categorize all available data packet types for a particular mobile device based on knowledge of all of the sensors in the device and the possible sensor data 114 that may be received by the packet generation device 104. In one embodiment, the database 112 may be loaded with this priority information and may be periodically updated when needed.

In the apparatus 100, the priority assignment device 106 assigns the data packet 116 to an assigned priority buffer. For illustrative purposes, assume the priority assignment device 106 assigned the data packet 116 to the second priority buffer 108_2; therefore, the second priority buffer 108_2 is referred to hereafter in this embodiment as the assigned priority buffer 108_2.

Figure 3:
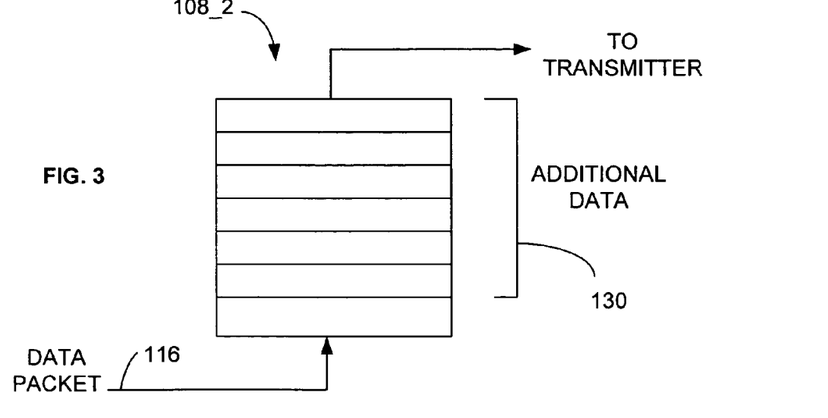
FIG. 3 illustrates a graphical representation of one embodiment of a priority buffer.

Each of the priority buffers 108 is associated with the corresponding transmission device 110 so that when available, the transmission device 110 may extract stored data packets and transmit the data packets to a receiver using the associated transmission medium. FIG. 3 illustrates a graphical representation of the assigned priority buffer 108_2. This buffer 108_2 is illustrated as a FIFO buffer, where the data packet 116 is written to a back end of the buffer. It is recognized that any suitable memory structure may be used. The buffer 108_2 may include additional data 130, which may be other data packets awaiting transmission. As described above, since the apparatus 100 is in a mobile device, the transmitter 110_2 associated with the assigned priority buffer 108_2 is not necessarily in active communication as the mobile device may be out of communication range. Therefore, the additional data 130 and the data packet 116 may be buffered until communication may be performed.

Referring back to FIG. 1, once the apparatus 100 is within a transmission range of the transmission device 110_2, the additional data 130 is transmitted because it is already within the buffer 108_2. Once the additional data 130 is transmitted, the data packet 116 may thereupon be transmitted. The apparatus 100 provides for the prioritization of the data packets into one of a variety of buffers for subsequent transmission. The prioritization is based on the data being transmitted as well as the transmission characteristics. This apparatus 100 allows for prioritization for data packets and subsequent optimization of transmissions and the associated costs, availability and bandwidth factors. In one example, a data packet having a high importance may be assigned a high priority, where the high priority includes a large transmission cost associated therewith. For example, if the sensor 102 indicates that a component has failed, the importance of this data packet 116 may warrant using a highly expensive transmission medium having a high degree of availability, for example a satellite communication. Whereas if the sensor 152 indicates a low priority data, this may be buffered into a less expensive transmission medium have a greatly reduced availability, such as a WLAN.

Figure 4:
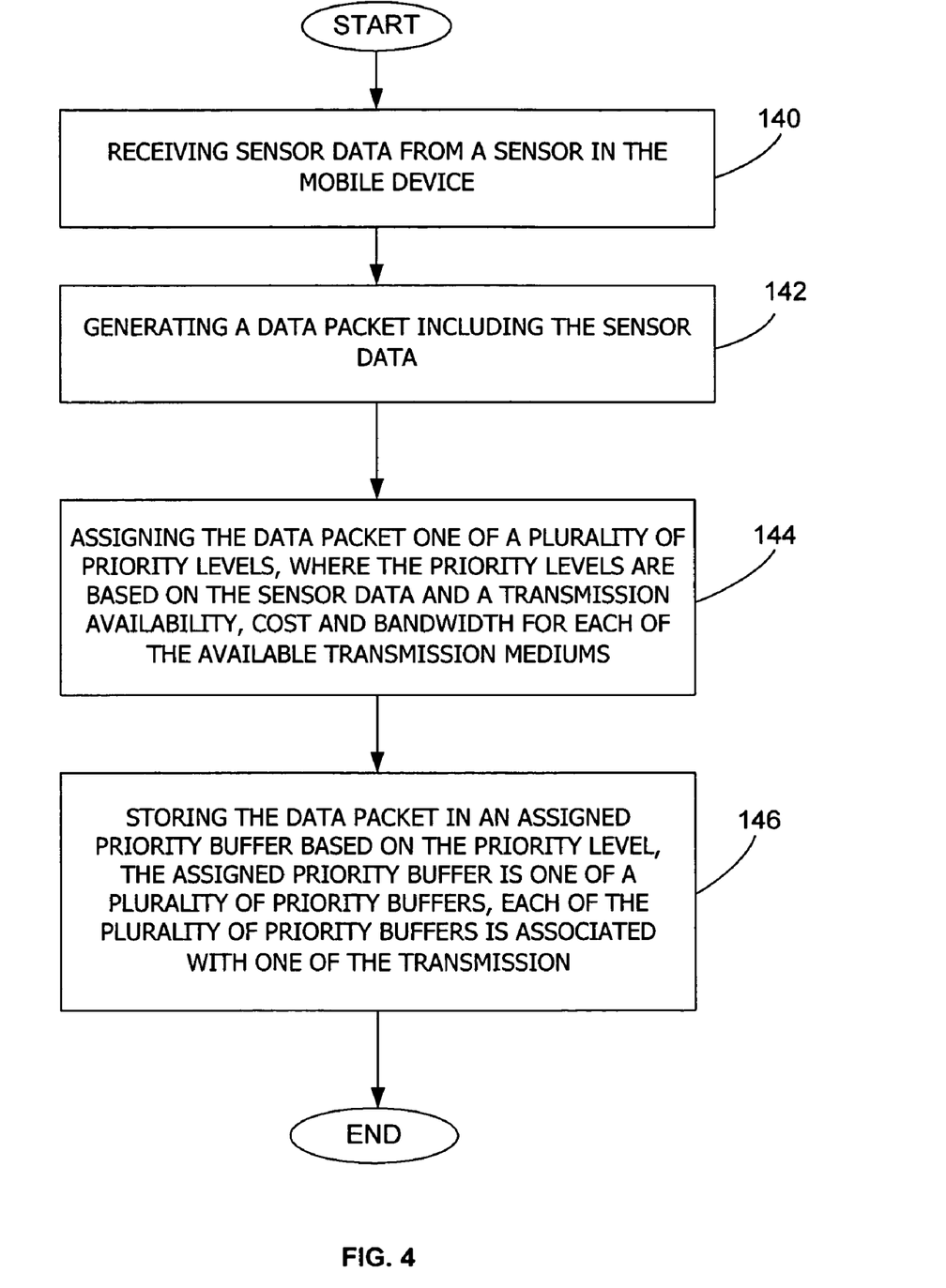
FIG. 4 illustrates a flowchart of one embodiment of a method for prioritized transmission of data.

FIG. 4 illustrates the steps of one embodiment of a method for transmitting sensor data from a mobile device. This embodiment of the method begins, step 140, by receiving sensor data from a sensor in the mobile device. In one example, the mobile device may be an industrial truck used for hauling items between pick-up locations, work sites and possible disposal locations. The sensor data may relate to the operation of the device, for example sensor data may be an oil pressure signal indicating an oil pressure level within the engine.

The next step, step 142, is generating a data packet including the sensor data and a time stamp indicating a time of the data packet generation. This step may be performed by a packet generation device, such as the device 104 of FIG. 1. This device 104 may be incorporated with the on-board computer of the industrial truck. This step may also include preprocessing of the sensor data. For example, if the sensor data is oil pressure data, the data may be converted based on a weight factor of the oil in the engine (e.g. 10W/30 oil versus 10W/40 oil).

The next step, step 144, is assigning a priority level to the data packet. The assigned priority level is one of a number of available priorities. The priority level to which the data packet is assigned is based on the sensor data and a transmission cost for each of the available transmission mediums. In the example of an oil pressure data packet, the data packet is assigned a priority. A first component of the assignment is the available types of transmission mediums. As an example, the truck may include the ability to transmit using four different mediums: a Bluetooth communication, a WLAN communication, a cellular communication and a satellite based communication. Each of these mediums include corresponding costs as well as bandwidth and range considerations. The Bluetooth and WLAN mediums may have significant bandwidth capabilities with very little associated costs, but offer a very limited range. The cellular medium has a larger range but a higher cost and a smaller bandwidth. Similarly, the satellite medium has an almost unlimited range, with very high costs and limited bandwidth.

Based on these considerations, predeterminations may be made to assign different data packets to different priorities. In this example, if the data packet indicates that the sensor data relates to oil pressure and it is not outside of a defined range, the data packet may be given a low priority. If the sensor data indicates that the oil pressure is well above threshold values and may be an emergency situation, the data packet may be given the highest priority available.

Once the priority level is assigned, the next step, step 146, is storing the data packet in an assigned priority buffer based on the priority level, where the assigned priority buffer is one of a plurality of priority buffers associated with the transmission devices. As discussed above, in one embodiment each transmission device includes a buffer storing data to be transmitted. In this example, the truck may include four transmitting devices, a Bluetooth transmitter, a WLAN transmitter, a cellular transmitter and a terrestrial transmitter. Each transmitter includes a corresponding buffer of data awaiting transmission.

Assume the oil pressure data packet is given a low priority and stored in the buffer associated with the WLAN transmitter. In this example, when the truck is within the WLAN's transmission range, the data packet may be transmitted in sequential order with the additional data in the buffer. If the communication session is not long enough, the data packet will be advanced within the buffer for transmission during a next session. Therefore, through the assigning of a priority level to the data packet, where this priority level is based on conditions associated with the transmission medium, sensor data may be transmitted in a preferred sequence based on available communications from the mobile device to a receiving device.

Figure 5:
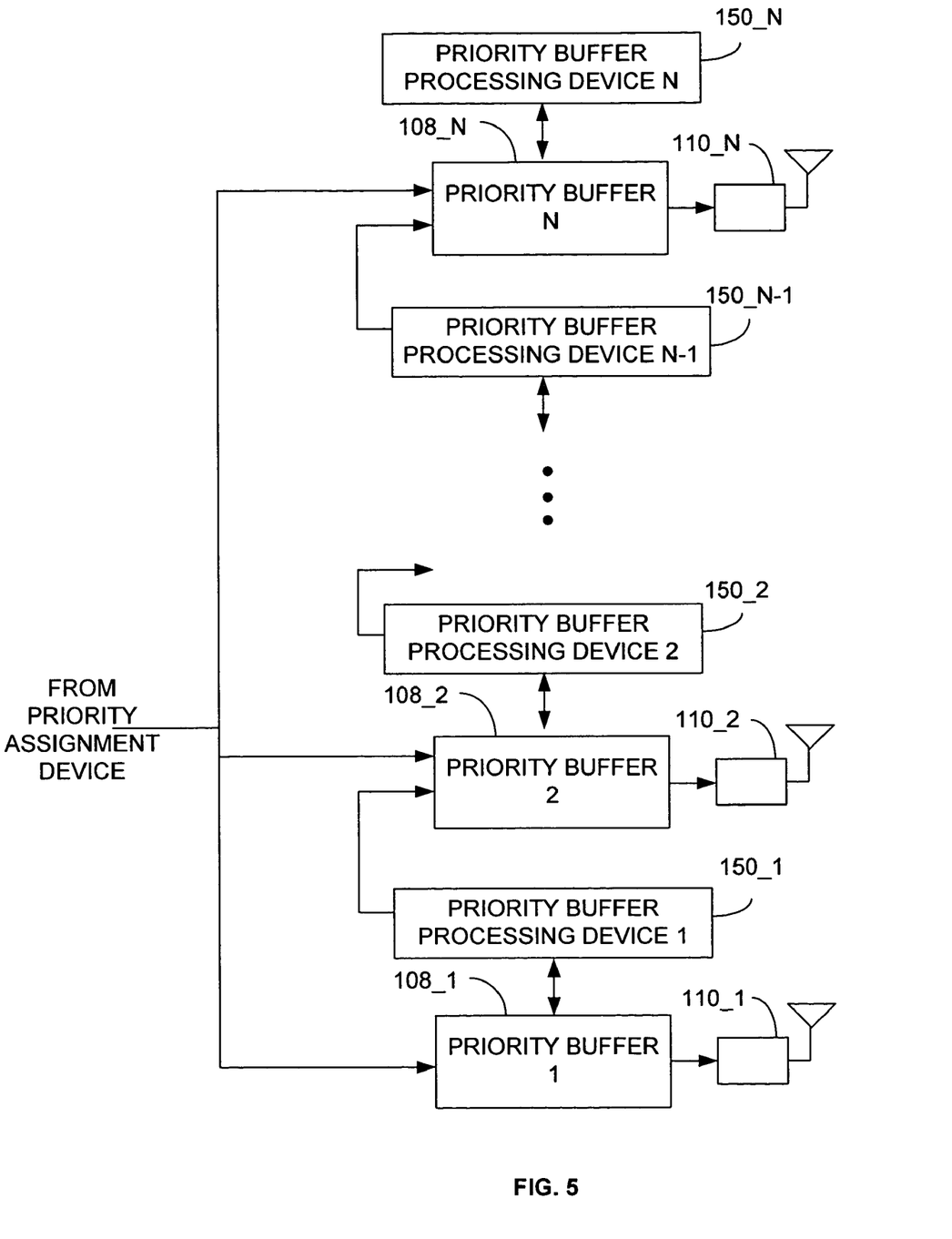
FIG. 5 illustrates a block diagram of another embodiment of an apparatus for prioritized transmission of data.

FIG. 5 illustrates a block diagram of another embodiment of an apparatus for transmitting sensor data from a mobile device. The block diagram illustrates an additional portion of the apparatus 100 as illustrated in FIG. 1. Each of the priority buffers 108 includes an additional priority buffer processing device 150_1, 150_2, 150_N (collectively referred to as 150). Each of the processing devices 150 is associated with a corresponding priority buffer to monitor the timeliness of the data packet 118 in the buffer 108.

As discussed above, the packet generation device (104 of FIG. 1) may include the time stamp (for example element 124 of FIG. 2). This time stamp may indicate when the data packet was generated and allow the processing devices 150 to determine a possible time delay between the time when the data packet is generated and written to the buffer 108 and transmitted with the transmission device 110. The priority buffer processing device 150 may be one or more processing elements, for example each buffer 108 may include a separate processing element 150 (as illustrated in FIG. 5). In another embodiment, a central or secondary processing device may provide the functionality for all of the priority buffer processing devices 150 when the timeliness of the stored data packets can be monitored.

Figure 6:
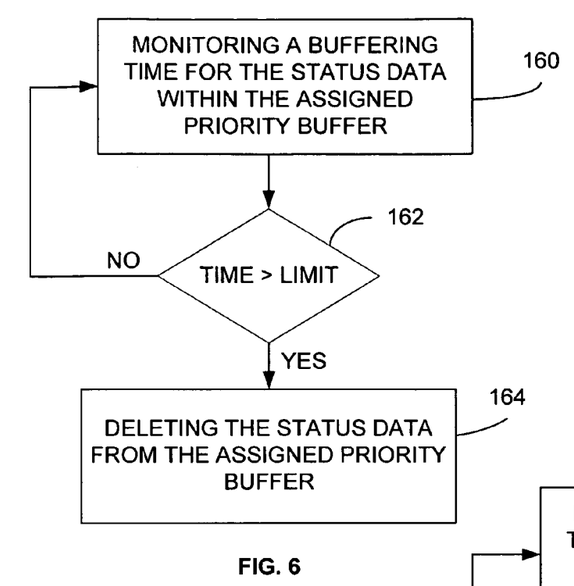
FIG. 6 illustrates a flowchart of another embodiment of a method for prioritized transmission of data.
Figure 7:
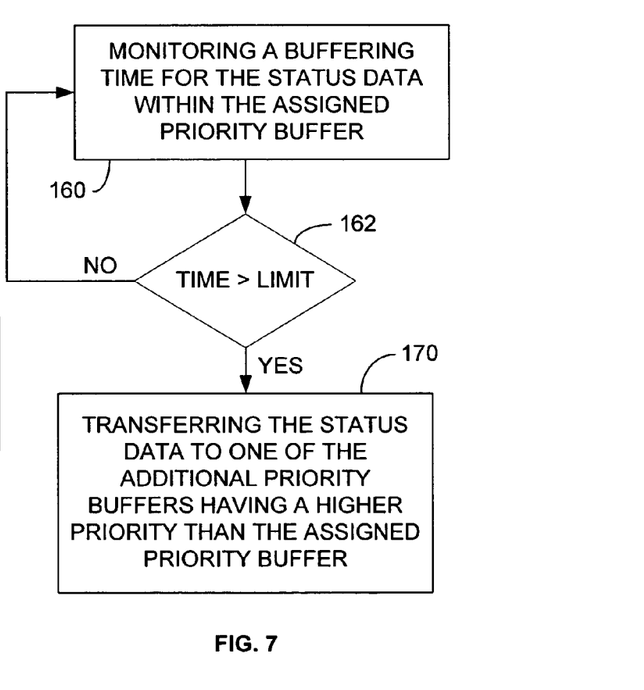
FIG. 7 illustrates a flowchart of another embodiment of a method for prioritized transmission of data.
Figure 8:
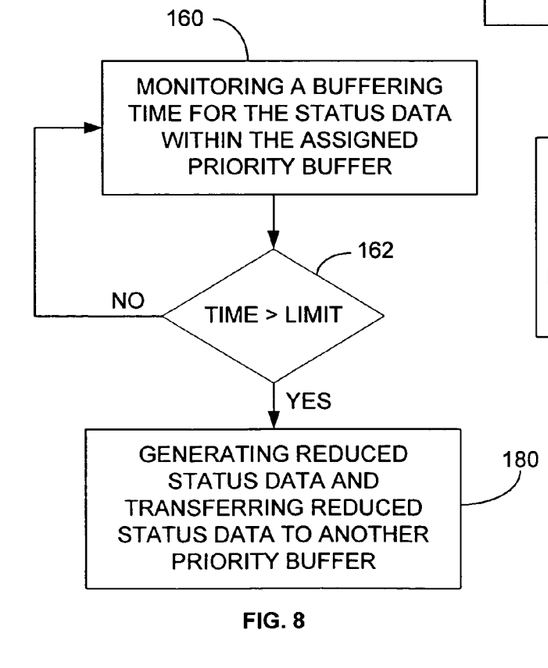
FIG. 8 illustrates a flowchart of another embodiment of a method for prioritized transmission of data.

As illustrated with the flowcharts of FIGS. 6-8, there may be various embodiments utilizing the priority buffer processing device 150. In one embodiment, illustrated in FIG. 6, the priority buffer processing device 150 may monitor a buffering time for the data packet within the assigned priority buffer 108, step 160. This step may be performed by various recognized techniques, such as referencing a time in which the data packet is assigned to the buffer with tracking the data packets that are retrieved from the buffer for transmission. Another technique is to periodically check the buffer for data packets and reference the time stamp to a master time clock to calculate the inter-buffer delay time.

The buffer time, which is the time in which the data packet is in the priority buffer 108, is then compared to a predetermined time limit, step 162. This time limit may be a general time limit or in another embodiment may be adjusted based on the priority level of the data packet 116. For example, a low priority data packet may have a greater time limit than a high priority data packet. If the buffer time is less than the time limit, no actions are taken. The method would revert back to step 160 to further monitor the time the data packet is in the priority buffer.

If the buffer time is greater than the time limit, one embodiment may include deleting the data packet 116 from the assigned priority buffer, step 164. This step may be performed by the priority buffer processing device 150. Based on the lack of timeliness in transmitting the data packet, the data packet 116 may not be timely anymore. This embodiment may be found in a situation where the transmission medium has a small transmission range and the mobile device is not within the range for an extended period of time. Another example may be where another iteration of sensor data is collected in another data packet, which would render the current data packet unnecessary.

FIG. 7 illustrates another embodiment of a method using the priority buffer processing device 150. In this embodiment, the steps 160 and 162 are similar. In the event the buffer time is greater than the predetermined time limit, the next step, step 170, includes transferring the data packet 116 to one of the additional priority buffers having a higher priority than the assigned priority buffer. As illustrated in FIG. 5, the priority buffer processing device 150 is coupled to the next priority level buffer. The processing device 150 may extract the data packet from the assigned priority buffer and write it to the next buffer. For example, if the assigned priority buffer is the first priority buffer 108_1, the first priority buffer processing device 150_1 may transfer the data packet 118 to the second priority buffer 108_2. When in this buffer 108_2, the data packet may have a greater chance of being transmitted.

The data packet may also be provided to further buffers as directed. In this embodiment, the different priority buffer processing devices may forward the data packet up to the different priority buffers 108, but it is recognized that the processing device 150 may seek to transmit the data packet directly to the appropriate buffer 108.

FIG. 8 illustrates another embodiment monitoring the time the data packet is in the priority buffer. This method, similar to the methods of FIGS. 6 and 7, include steps 160 and 162. Once the buffer time is greater than the predefined time limit, this embodiment includes the step of, step 180, generating reduced status data. This step may be performed by the processing device 150 and can include different processing techniques to reduce the data. For example, one technique may be compressing the data packet. Another technique may be to perform some type of data analysis to reduce the amount data contained therein. Another technique may be to cull extraneous data. It is further recognized that there exists other suitable techniques as recognized by one skilled in the art.

In this embodiment, step 180 includes the further step, similar to step 170 in the embodiment of FIG. 7, of transferring the data to another priority buffer. As the data is based on a higher priority level buffer, it may more quickly be transmitted by the mobile device. Another embodiment not specifically illustrated is that the processing device 150 may do nothing. The device 150 may recognize the delay and decided that no actions are required.

It is through the assignment of a priority level that the transmission of data packets may be controlled. The priority level assignment is based on factors relating to the data and corresponding transmission mediums. With predefined prioritization levels, different types of data packets having various amounts of sensor data can be afforded transmission priority maximizing transmission resources. When the transmission medium is available, data packets corresponding to the cost, range and bandwidth of the transmission medium are transmitted. In this technique, expensive limited bandwidth of a cellular medium is not utilized when a WLAN high bandwidth low cost transmission would be suitable for the priority of the data packet. Similarly, if the sensor data indicates a data packet deemed a high priority for the system, this data packet won't be queued in a low priority buffer until the mobile device is in a medium's limited transmission range when it is warranted to use the expensive transmission of a large ranged medium. When the prioritized data cannot be readily transmitted, the data is stored in the buffers for later transmission. Additionally, using the priority buffer processing devices, the timeliness of the data packets in the monitored and adjusted if needed.

Although the preceding text sets forth a detailed description of various embodiments, it should be understood that the legal scope of the invention is defined by the words of the claims set forth below. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principals disclosed and claimed herein.

What is claimed is:

1. An apparatus for prioritized transmission of data from a mobile device using a plurality of transmission mediums, the apparatus comprising:

a packet generation device operative to receive sensor data and generate a data packet including the sensor data;

a priority assignment device coupled to the packet generation device, operative to receive the data packet and assign the data packet into one of a plurality of priority levels, where the priority levels are based on the sensor data and a transmission availability, bandwidth and cost for each of the transmission mediums;

a plurality of priority buffers, each priority buffer associated with one of the transmission mediums, such that the data packet is written to an assigned priority buffer, which is one of the plurality of priority buffers, for transmission using the transmission medium associated with the assigned priority buffer; and a plurality of priority buffer processing devices, each priority buffer processing device coupled to and associated with one of the plurality of priority buffers, the priority buffer processing device associated with the assigned priority buffer is operative to monitor a buffering time for the data packet stored in the assigned priority buffer;

wherein the priority buffer processing device associated with the assigned priority buffer is operative to process the data packet to generate reduced data packet and transfer the reduced data to another one of the plurality of priority buffers having a higher priority than the assigned priority buffer, if the buffering time is beyond a predetermined time limit.

2. The apparatus of claim 1 further comprising: a sensor disposed within the mobile device operative to generate the sensor data.

3. The apparatus of claim 1 further comprising:
a plurality of transmission devices operative to transmit the data packet using an associated transmission medium, each of the transmission devices associated with one of the priority buffers; and
when the mobile device is within a transmission range of the transmission medium associated with the assigned priority buffer, the transmission device associated with the assigned priority buffer is operative to retrieve the data packet from the assigned priority buffer and transmit the data packet using the associated transmission medium.

4. The apparatus of claim 3 wherein the assigned priority buffer includes additional data packets previously stored therein such that the additional data packets are transmitted prior to the transmission of the data packet.

5. The apparatus of claim 1 wherein the priority buffer processing device associated with the assigned priority buffer is operative to delete the data packet from the assigned priority buffer if the buffering time is beyond the predetermined time limit.

6. The apparatus of claim 1 wherein the priority buffer processing device associated with the assigned priority buffer is operative to transfer the data packet to another one of the plurality of priority buffers having the higher priority than the assigned priority buffer, if the buffering time is beyond the predetermined time limit.

7. A method for transmitting sensor data from a mobile device comprising:
receiving sensor data from a sensor in the mobile device;
generating a data packet including the sensor data;
assigning the data packet one of a plurality of priority levels, where the priority levels are based on the sensor data and transmission availability, bandwidth and cost for each of a plurality of transmission mediums;
storing the data packet in an assigned priority buffer based on the priority level, the assigned priority buffer is one of a plurality of priority buffers, each of the plurality of priority buffers is associated with one of the plurality of transmission mediums for transmitting the data packet;
assigning a time stamp to the data packet indicating a time of the data packet generation; and
monitoring a buffering time for the data packet within the assigned priority buffer based on the time stamp;
if the buffering time is beyond a predetermined time limit, processing the data packet to generate reduced data packet and transferring the reduced data to another one of the plurality of priority buffers having a higher priority than the assigned priority buffer.

8. The method of claim 7 further comprising:
when the mobile device is within a transmission range of the transmission medium associated with the assigned priority buffer:
retrieving the data packet from the assigned priority buffer; and
transmitting the data packet using the transmission medium with which the assigned priority buffer is associated.

9. The method of claim 8 wherein the assigned priority buffer includes additional data packets previously stored therein such that the additional data packets are transmitted prior to the transmission of the data packet.

10. The method of claim 7 further comprising:
if the buffering time is beyond the predetermined time limit, deleting the data packet from the assigned priority buffer.

11. The method of claim 7 further comprising:
if the buffering time is beyond the predetermined time limit, transferring the data packet to another one of the plurality of priority buffers having the higher priority than the assigned priority buffer.

12. A mobile device having prioritized transmission of data using a plurality of transmission mediums, the mobile device comprising:
a sensor disposed within the mobile device operative to generate a sensor data;
a packet generation device operative to receive the sensor data and generate a data packet including the sensor data;
a priority assignment device coupled to the packet generation device and operative to receive the data packet and assign the data packet one of a plurality of priority levels, where the priority levels are based on the sensor data and a transmission availability, bandwidth and cost for each of the transmission mediums;
a plurality of priority buffers, each priority buffer associated with one of the transmission mediums, such that the data packet is written to an assigned priority buffer, which is one of the plurality of priority buffers; and
a plurality of priority buffer processing devices, each buffer processing device coupled to and associated with one of the plurality of priority buffers, the priority buffer processing device associated with the assigned priority buffer is operative to monitor a buffering time for the data packet stored in the assigned priority buffer;
wherein the priority buffer processing device associated with the assigned priority buffer is operative to process the data packet to generate reduced data packet and transfer the reduced data to another one of the plurality of priority buffers having a higher priority than the assigned priority buffer, if the buffering time is beyond a predetermined time limit.

13. The mobile device of claim 12 further comprising:
a plurality of transmission devices operative to transmit data using an associated transmission medium, each of the transmission devices associated with one of the priority buffers; and
when the mobile device is within a transmission range of the transmission medium associated with the assigned priority buffer, the transmission device associated with the assigned priority buffer is operative to retrieve the data packet from the assigned priority buffer and transmit the data packet using the associated transmission medium.

14. The mobile device of claim 12 wherein the priority buffer processing device associated with the assigned priority buffer is operative to delete the data packet from the assigned priority buffer if the buffering time is beyond the predetermined time limit.

15. The mobile device of claim 12 wherein the priority buffer processing device associated with the assigned priority buffer is operative to transfer the data packet to another one of the plurality of priority buffers having the higher priority than the assigned priority buffer, if the buffering time is beyond the predetermined time limit.

* * * * *

UNITED STATES PATENT AND TRADEMARK OFFICE
CERTIFICATE OF CORRECTION

| | |
|---|---|
| PATENT NO. | : 7,616,642 B2 |
| APPLICATION NO. | : 11/325824 |
| DATED | : November 10, 2009 |
| INVENTOR(S) | : Anke et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this

Nineteenth Day of October, 2010

David J. Kappos
*Director of the United States Patent and Trademark Office*